3,786,118
N-ALLYL PHOSPHOROTHIOAMIDATES
Masachika Hirano, Minoo, Kunio Mukai, Nishinomiya, and Hisami Takeda and Katsutoshi Tanaka, Takarazuka, Japan, assignors to Sumitomo Chemical Company, Limited, Osaka, Japan
No Drawing. Filed Nov. 11, 1971, Ser. No. 197,923
Claims priority, application Japan, Dec. 17, 1970, 45/114,365
Int. Cl. A01n 9/36; C07f 9/24
U.S. Cl. 260—948        10 Claims

ABSTRACT OF THE DISCLOSURE

A phosphorothioamidate having the formula,

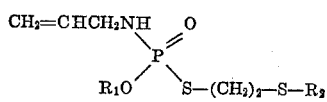

wherein $R_1$ is methyl or ethyl, and $R_2$ is an alkyl having 1 to 4 carbon atoms, which is useful as a systemic pesticide for controlling injurious pests, and which is prepared by the condensation of a thiophosphate having the formula,

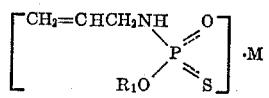

wherein $R_1$ is as defined above, and M is an alkali metal, with a halide having the formula, Hal—$(CH_2)_2$—S—$R_2$ wherein $R_2$ is as defined above, and Hal is a halogen.

---

This invention relates to a novel phosphorothioamidate having the Formula I,

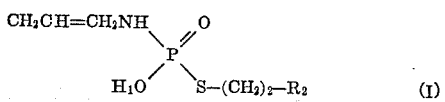

wherein $R_1$ is methyl or ethyl, and $R_2$ is an alkyl having 1 to 4 carbon atoms, and a systemic pesticide containing at least one said phosphorothioamidate (I).

The phosphorothioamidate (I) can be prepared by reacting a thiophosphate having the Formula (II),

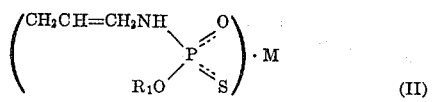

wherein $R_1$ is as defined above, and M is an alkali metal, with a halide having the Formula (III), Hal—$(CH_2)_2$—S—$R_2$    (III)

wherein $R_2$ is as defined above, and Hal is a halogen, in a solvent.

Examples of the said solvent are polar solvents such as alcohols (methyl alcohol, ethyl alcohol), acetone and water. The reaction temperature and the reaction time depend on the solvent to be used, and usually the reaction may be completed for one to several hours under reflux.

Typical examples of the phosphorothioamidates thus prepared are as follows, but the scope of the present invention is, of course, not limited thereto.

| Compound No. | Formula |
|---|---|
| (1) | $CH_2=CHCH_2NH$, $C_2H_5O$, $O$, $S—CH_2CH_2S\ C_2H_5$ |
| (2) | $CH_2=CHCH_2NH$, $CH_3O$, $O$, $S—CH_2CH_2S\ C_2H_5$ |
| (3) | $CH_2=CHCH_2NH$, $CH_3O$, $O$, $S—CH_2CH_2S\ CH_3$ |
| (4) | $CH_2=CHCH_2NH$, $CH_3O$, $O$, $S—CH_2CH_2S\ C_4H_9(n)$ |
| (5) | $CH_2=CHCH_2NH$, $C_2H_5O$, $O$, $S—CH_2CH_2S\ CH_3$ |

The phosphorothioamidates (I) are suitable for controlling injurious insects, particularly in agriculture. Examples of the injurious insects controlled effectively by the phosphorothioamidates (I) are, for example, planthoppers, mites, borers, scales and mealybugs, and nematodes, and other Lepidoptera, Diptera, Coleoptera, Hemiptera, and other arthropoda can be also controlled by them.

There are usually known as systemic actions either action that chemicals penetrate into tissues of plants and animals, or action that they move therein after the penetration. I is notable that the phosphorohioamidates (I) have both excellent systemic actions, and moreover have biological activities such that by use of a concentration lower than a lethal one of the phosphorothioamidates (I), a transformation of insects is caused to be disturbed and a normal propagation is prevented. Further, the phosphorothioamidates (I) have so excellent contact insecticidal effects that they can effectively control insects and mites having power of resistance to the conventional biological chemicals.

As the compounds analogous to the present Compounds I, there are known in the specifications of U.S. Pat. No. 3,019,250, DAS No. 1,077,215 and DAS No. 1,135,905, a phosphate having the formula,

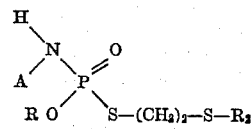

wherein $R_1$ and $R_2$ are as defined above, and A is hydrogen or an alkyl. In order to substantiate a superiority of the present compounds in insecticidal effects to the known compounds mentioned above, a test example is given as follows.

TEST EXAMPLE

Into a flower pot having about 10 cm. in diameter 18 to 23 rice plants per pot were grown up to 3 to 4 leaves stage, and was sprayed thereon each 1000 fold emulsion with water of the compounds in a form of 50% emulsifiable concentrate by means of a turn table, and was air-dried. Each pot was covered with a wire cage, and 20 to 30 adults of smaller brown planthoppers were released thereinto. The dead and alive were observed after 24 hours. Further the planthoppers were released according to the lapse of days to know the residual effects of the compounds. The results are as shown in the following table.

| Compound | Days elapsed after the spraying and lethal ratio percent | | | |
|---|---|---|---|---|
| | 1 day | 4 days | 7 days | 11 days |
| Present compound (1) | 100 | 76.0 | 61.3 | 21.4 |
| Present compound (2) | 92.3 | 98.8 | 100 | 96.4 |
| Present compound (3) | 100 | 100 | 67.7 | 14.3 |
| $\begin{array}{c}NH_2\quad O\\ \diagdown\;\;//\\ \;\;\;P\\ \diagup\;\;\diagdown\\ C_2H_5O\quad S-(CH_2)_2-S-C_2H_5\end{array}$ [a] | 100 | 58.3 | 31.4 | 21.3 |
| $\begin{array}{c}CH_3HN\quad O\\ \diagdown\;\;//\\ \;\;\;P\\ \diagup\;\;\diagdown\\ C_2H_5O\quad S-(CH_2)_2-S-C_2H_5\end{array}$ [b] | 77.8 | 63.4 | 71.1 | 12.4 |
| $\begin{array}{c}C_2H_5HN\quad O\\ \diagdown\;\;//\\ \;\;\;P\\ \diagup\;\;\diagdown\\ CH_3O\quad S-(CH_2)_2-S-CH_3\end{array}$ [c] | 93.4 | 66.7 | 51.4 | 10.0 |

[a] The compound disclosed in Example 12 of U.S.P. No. 3,019,250.
[b] The compound disclosed in Example 28 of the said U.S.P.
[c] The compound disclosed in D.A.S. No. 1,077,215.

The present Compounds I may be used as it is without addition of other components, and may be combined with a carrier in order to form preparations which are handled easily in a practical use. According to the procedure well known by the skilled in the art, the present Compounds I may be optionally formulated into emulsifiable concentrates, wettable powders, oil sprays, dusts, aerosols, heating fumigants, fine granules, granules or the like. If desired, the present Compounds I may be combined with one or more of other active ingredients and fertilizers in order to widen and enhance the effects thereof.

For example, multi-purpose preparations may be prepared by the combination with the other organic phosphorus insecticides such as Sumithion (a trademark of Sumitomo Chemical Co., in Japan) and Dimetoate, pyrethroid insecticides such as allethrin and pyrethrin, organic chlorine insecticides such as BHC and DDT, carbamate insecticides such as 3,4 - dimethylphenyl-N-methylcarbamate, 2 - sec.-butylphenyl-N-methylcarbamate, 3-methylphenyl-N-methylcarbamate and 1-naphthyl-N-methylcarbamate, synergists, repellents, attractants and other analogues, and as the results thereof, a certain synergistic effect may be expected.

The present invention will be illustrated in more detail with reference to the following examples, which are only illustrative but not limitative. Percent and part are by weight.

Synthesis of the Compound I

Example 1.—Into a solution of 12.0 g. of potassium O-ethyl-N-allylphosphorothioamidate in 70 ml. of ethyl alcohol is added 6.2 g. of ethylthioethyl chloride, and the mixture is stirred for 2 hours under reflux. The solvent is removed by distillation under a reduced pressure, and water is added to the residue. The mixture is extracted with chloroform. The chloroform layer is dried over anhydrous sodium sulfate, and the chloroform is removed by distillation under a reduced pressure, whereby 11.4 g. of O-ethyl-S-(2 - ethylthioethyl)-N-allyl-phosphorothioamidate is obtained as a yellow oil, $N_D^{25.5}$ 1.5183.

Elementary analysis.—Calculated (percent) (as $C_9H_{20}NO_2PS_2$): P, 11.50; S, 23.80; N, 5.20. Found (percent) P, 10.97; S, 23.88; N, 5.09.

Example 2.—According to the procedure similar to that of Example 1, the following compounds are obtained.

| Ex. No. | Thiophosphate | Halide | Compound obtained | | Elementary analysis | | | | | |
|---|---|---|---|---|---|---|---|---|---|---|
| | | | Phosphorothioamidate | Refractive index | Formula | Calc'd | | | Found | | |
| | | | | | | P | S | N | P | S | N |
| 2 | Potassium O-methyl-N-allylphosphorothioamidate. | Ethylthioethyl chloride. | O-methyl-S-(2-ethylthioethyl)-N-allylphosphrothioamidate. | $N_D^{20.5}$ 1.5215 | $C_8H_{18}NO_2PS_2$ | 12.13 | 11.25 | 5.49 | 12.00 | 24.95 | 5.24 |
| 3 | do | 2-methylthioethyl chloride. | O-methyl-S-(2-methylthioethyl)-N-allylphosphorothioamidate. | $N_D^{26.0}$ 1.5301 | $C_7H_{16}NO_2PS_2$ | 12.84 | 26.57 | 5.80 | 12.74 | 26.71 | 5.52 |
| 4 | Potassium O-ethyl-N-allylphosphorothioamidate. | do | O-ethyl-S-(2-methylthioethyl)-N-allylphosphorothioamidate. | $N_D^{25.0}$ 1.5244 | $C_8H_{10}NO_2PS_2$ | 12.13 | 25.11 | 5.49 | 11.77 | 25.42 | 5.37 |

Preparation of the pesticidal composition

Example 5: Emulsifiable concentrate.—Each compound mentioned in the following table is mixed with a solvent and an emulsifier in a mixing ratio mentioned below, whereby each uniform emulsifiable concentrate is obtained. In a practical use, the concentrates are diluted with water.

| Active ingredient (percent) | Solvent (percent) | Emulsifier (percent) |
|---|---|---|
| Compound (1), 50 | Xylol, 30 | Sorpol-2020, 20.[a] |
| Compound (5), 20 | Cyclohexanone, 50 | Sorpol-2539, 30.[a] |

[a] Sorpol is a trademark of Toho Chem. Co., in Japan.

Example 6: Wettable powder.—Into 55 parts of 200 mesh talc, is added dropwise a mixture of 40 parts of the Compound 4 and an emulsifier (Sorpol-2492: a trademark of Toho Chem. Co., in Japan), while being stirred well in a mixer, whereby a wettable powder is obtained. In a practical use, the powder is diluted with water.

Example 7: Granule.—Each compound, a binder and a diluent mentioned in the following table are well mixed in this order, and the mixture is mixed with a small amount of water, granulated by means of a granulator and dried, whereby each granule is obtained.

In a practical use, the granule is spread as it is.

| Active ingredient (percent) | Binder (percent) | Diluent (percent) |
|---|---|---|
| Compound (1), 2 | Sodium ligninsulfonate, 1 | Clay, 97. |
| Compound (2), 5 | Sodium ligninsulfonate, 2 | Clay, 93. |

Example 8: Dust.—In a mixing ratio mentioned below, a solution of each compound in a small amount of acetone is well mixed with 200 mesh talc, and thereafter evaporation of acetone gives each dust. In a practical use, the dust is spread as it is.

| Active ingredient (percent) | Diluent (percent) |
|---|---|
| Compound (3), 2 | Talc, 98. |
| Compound (4), 4 | Talc, 96. |

The following test examples are given in order to substantiate a pesticidal effect of the present compound on insects and fungi.

Test Example 1: Lethal effect on carmine mite (*Tetranychus telarius*).—Many of carmine mites were made parasitic on mottled kidney beans at a 2 leaves stage 10 days after the sowing. Into each aqueous dilution of the present compounds in a form of a wettable powder, were dipped leaves of the bean, on which the mites were parasitic, for one minute, and were given water in order not to be died. After 48 hours, the death and alive were observed microscopically to calculate $LC_{50}$ (medium lethal concentration). The results are as shown in the following table.

| Compound No.: | $LC_{50}$ (dilution times) |
|---|---|
| (1) | 500,000 |
| (2) | 1,500,000 |
| (3) | 420,000 |
| (4) | 60,000 |
| (5) | 250,000 |

Test Example 2: Insecticidal effect on mites in the soil treatment.—In a flower pot having about 10 cm. in diameter, mottled kidney beans were grown up to a 2 leaves stage, and the present compounds in a form of 5% granules were spread near the root thereof in a ratio of 4 kg./10 ares. According to the lapse of days, adults of carmine mites (*Tetranychus telarius*) were parasitic thereon, and after 48 hours, the death and alive of the mites on the leaves were observed microscopically. The results are as shown in the following table.

| | Days elapsed and lethal ratio (percent) | | | | |
|---|---|---|---|---|---|
| Compound No. | After 1 day | After 4 days | After 7 days | After 11 days | After 16 days |
| (1) | 26.4 | 96.6 | 88.9 | 94.7 | 100 |
| (2) | 56.7 | 73.4 | 82.1 | 96.4 | 92.3 |
| (3) | 12.4 | 67.3 | 100 | 100 | 87.3 |
| (4) | 21.3 | 92.4 | 88.3 | 67.4 | 53.4 |
| (5) | 56.3 | 100 | 100 | 100 | 96.7 |

Test Example 3: Lethal effect on smaller brown planthoppers (*Laodelphax striatellus*). Rice plants (15 cm. to 20 cm. tall) which had elapsed 15 days after germination were dipped into each aqueous dilution of the present compounds in a form of emulsifiable concentrates, for one minute, and after air-drying, were placed into a glass tube. Thereafter, 20 to 30 planthoppers were released therein, and covered with a wire net. After 24 hours, the death and alive were recorded to calculate $LC_{50}$. The results are as shown in the following table.

| Compound No.: | $LC_{50}$ (dilution times) |
|---|---|
| (1) | 120,000 |
| (2) | 130,000 |
| (3) | 240,000 |
| (4) | 670,000 |
| (5) | 200,000 |

Test Example 4: Effect on smaller brown planthoppers in the soil treatment.—Each 6% granules of the present compounds was spread in a ratio of 6 kg./10 ares near the root of rice plants grown at the tillering stage in an 1/1000,000 Wagner's pot, and adults of the planthoppers were released according to the lapse of days and covered with a wire cage. After 24 hours, the death and alive were recorded. The results are as shown in the following table.

| | Days elapsed and lethal ratio (percent) | | | | |
|---|---|---|---|---|---|
| Compound No. | After 1 day | After 4 days | After 7 days | After 11 days | After 15 days |
| (1) | 100 | 76.0 | 76.7 | 5.1 | 0 |
| (2) | 100 | 100 | 100 | 100 | 83.4 |
| (3) | 93.4 | 83.4 | 77.8 | 59.8 | 51.2 |
| (4) | 100 | 63.4 | 32.4 | 21.3 | 0 |
| (5) | 83.4 | 100 | 100 | 100 | 98.3 |

Test Example 5: Effect on green peach aphids (*Myzus persicae*) in the soil treatment.—Many of the aphids were made parasitic on Chinese cabbages grown in a pot one month after the sowing, and each 5% granules of the present compounds was spread at a rate of 6 kg./10 ares near the root thereof. After 3 days, the death and alive were recorded to calculate the lethal ratio. The results are as shown in the following table.

| Compound No.: | Lethal ratio (percent) |
|---|---|
| (1) | 100 |
| (2) | 100 |
| (3) | 100 |
| Dimetoate | 100 |

Test Example 6: Residual effect on two-spotted spider mites (*Tetranychus urticae*).—Each 3% dust of the present compounds was spread in a ratio of 3 kg./10 ares on mottled kidney beans at a 2 leaves stage in a flower pot 20 days after the sowing by means of a bell jar duster, and according to the lapse of days, adults of the mites were made parasitic thereon. After 48 hours, the lethal ratio was calculated. The results are as shown in the following table.

| | Days elapsed and lethal ratio (percent) | | | |
|---|---|---|---|---|
| Compound No. | After 1 day | After 3 days | After 7 days | After 12 days |
| (1) | 100 | 91.3 | 83.4 | 72.1 |
| (2) | 100 | 83.4 | 63.4 | 44.2 |
| (3) | 100 | 100 | 93.4 | 83.4 |
| (4) | 98.4 | 96.7 | 88.3 | 21.3 |
| (5) | 88.3 | 72.1 | 63.4 | 14.5 |

Test Example 7: Effect on various tortrixes and aphids.—In an apple tree garden which has been damaged by the tortrixes and aphids, each 5% granules of the present compounds was spread 1 cm.-radius-circlewise in a ratio of 7 g./tree near the root of a 5 years old apple tree. The following results were obtained 5 days after the spreading.

| | Number of the parasite before spreading per 500 leaves | | Number of the alive parasite per 500 leaves after 5 days | |
|---|---|---|---|---|
| Compound No. | Tortrixes | Aphids | Tortrixes | Aphids |
| (1) | 250 | 5,730 | 13 | 150 |
| (2) | 137 | 4,250 | 2 | 273 |
| (3) | 201 | 4,894 | 21 | 120 |

Test Example 8: Controlling effect on powdery mildew (*Sphaerotheca fuliginea*).—Cucumbers (variety: Aonagafushinari) were grown up to a 3 to 4 leaves stage in a 9 cm. flower pot.

Each wettable powder of the present compounds was diluted with water to adjust the concentration of the active ingredient to 1000 p.p.m., and each 10 ml. per pot of the dilution was sprayed. Spore suspension of the powdery mildew was inoculated thereinto by spraying one day thereafter.

The degree of disease concerning upper 4 leaves was observed after 10 days and percentage of contraction was calculated from a spotted area. As is clear from the results shown in the following table, the present compounds stand comparison with a commercially available chemical in the controlling effects.

| | Concentration of the active ingredient (p.p.m.) | Number of leaves tested | Average percentage of contraction |
|---|---|---|---|
| Compound No.: | | | |
| (1) | 1,000 | 40 | 8.1 |
| (2) | 1,000 | 40 | 4.4 |
| (3) | 1,000 | 40 | 4.7 |
| (4) | 1,000 | 40 | 5.1 |
| (5) | 1,000 | 40 | 9.3 |
| 2-(1-methylheptyl)-4,6-dinitrophenyl crotonate [1] | 1,000 | 40 | 4.2 |
| Non-treatment | | 40 | 54.1 |

[1] A commercially available fungicide as Karathane.

Test Example 9: Controlling effect on rice blast (*Pyricularia oryzae*).—On rice plants grown up to a 4 leaves stage in a 9 cm. flower pot, was sprayed each emulsifiable concentrate of the present compounds in a ratio of 10 ml./pot by means of a spray gun. After 24 hours, the spore suspension of rice blast (*Pyricularia oryzae*) cultured in an oatmeal medium was inoculated by spraying. The number of spots produced on a top of the leaf was counted to know the controlling effect. As is clear from the results shown in the following table, the present compounds stand comparison with a commercially available chemical in the controlling effect.

| | Concentration of the active ingredient (p.p.m.) | Number of leaves tested | Number of spots per leaf |
|---|---|---|---|
| Compound No.: | | | |
| (1) | 500 | 15 | 6.5 |
| (2) | 500 | 15 | 6.9 |
| (3) | 500 | 15 | 8.3 |
| (4) | 500 | 15 | 6.7 |
| (5) | 500 | 15 | 10.3 |
| O,O-Diisopropyl-S-benzylphosphorothioate [1] | 500 | 15 | 6.1 |
| Non-treatment | | 15 | 83.8 |

[1] A commercially available fungicide as Kitazin P.

What is claimed is:

1. A compound of the formula,

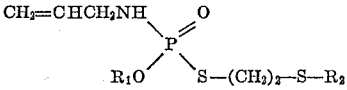

wherein R is methyl or ethyl, and $R_2$ is an alkyl having 1 to 4 carbon atoms.

2. A compound of claim 1, wherein $R_1$ is methyl.
3. A compound of claim 1, wherein $R_1$ is ethyl.
4. A compound of claim 1, wherein $R_2$ is methyl.
5. A compound of claim 1, wherein $R_2$ is ethyl.
6. A compound of claim 1, wherein $R_1$ is methyl and $R_2$ is methyl.
7. A compound of claim 1, wherein $R_1$ is methyl and $R_2$ is ethyl.
8. A compound of claim 1, wherein $R_1$ is methyl and $R_2$ is n-butyl.
9. A compound of claim 1, wherein $R_1$ is ethyl and $R_2$ is methyl.
10. A compound of claim 1, wherein $R_1$ is ethyl and $R_2$ is ethyl.

References Cited
UNITED STATES PATENTS 3,019,250  1/1962  Kayser et al. _____ 260—959 X
3,670,057  6/1972  Tsuchiya et al. ____ 260—959 X LEWIS GOTTS, Primary Examiner R. L. RAYMOND, Assistant Examiner U.S. Cl. X.R.

260—956, 979; 424—216